US012681416B2

(12) United States Patent
Mori et al.

(10) Patent No.: US 12,681,416 B2
(45) Date of Patent: Jul. 14, 2026

(54) FIXING DEVICE AND IMAGE FORMING APPARATUS

(71) Applicant: FUJIFILM Business Innovation Corp., Tokyo (JP)

(72) Inventors: Keitaro Mori, Kanagawa (JP); Toru Inoue, Kanagawa (JP); Toshiyuki Miyata, Kanagawa (JP); Kiyoshi Koyanagi, Kanagawa (JP); Sou Morizaki, Kanagawa (JP); Motoharu Nakao, Kanagawa (JP); Kazuyoshi Itoh, Kanagawa (JP); Jouta Kobayashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/316,226

(22) Filed: May 11, 2023

(65) Prior Publication Data

US 2024/0134306 A1 Apr. 25, 2024
US 2024/0231263 A9 Jul. 11, 2024

(30) Foreign Application Priority Data

Oct. 20, 2022 (JP) ................................ 2022-168002

(51) Int. Cl.
*G03G 15/20* (2006.01)

(52) U.S. Cl.
CPC . *G03G 15/2064* (2013.01); *G03G 2215/2025* (2013.01)

(58) Field of Classification Search
CPC .................. G03G 15/2064; G03G 2215/2025
See application file for complete search history.

(56) References Cited

U.S. PATENT DOCUMENTS

| | | | | |
|---|---|---|---|---|
| 5,648,838 | A * | 7/1997 | Michlin | G03G 15/09 399/119 |
| 2001/0032835 | A1* | 10/2001 | Murooka | H05B 3/0095 219/388 |
| 2011/0222931 | A1* | 9/2011 | Shinshi | G03G 15/2064 399/329 |
| 2014/0301762 | A1* | 10/2014 | Inoue | G03G 15/2057 399/333 |
| 2015/0198920 | A1* | 7/2015 | Fukuhata | G03G 15/2064 399/329 |
| 2017/0285537 | A1* | 10/2017 | Onaka | G03G 15/206 |

(Continued)

FOREIGN PATENT DOCUMENTS

| | | |
|---|---|---|
| JP | 2004093842 | 3/2004 |
| JP | 2006078578 | 3/2006 |

*Primary Examiner* — Sevan A Aydin
(74) *Attorney, Agent, or Firm* — JCIPRNET

(57) ABSTRACT

A fixing device includes a belt member that cyclically moves, a pressing unit that comes into contact with the belt member and presses a recording medium moving between the belt member and the pressing unit, and a heat source that includes a base material, a resistance heating element disposed on a surface of the base material along a longitudinal direction of the base material, and an insulator covering the resistance heating element and that comes into contact with the pressing unit via the belt member to heat an inner surface of the belt member, in which the insulator is formed to cover a corner portion of the base material in a direction of movement of the belt member.

8 Claims, 7 Drawing Sheets

(56) References Cited

U.S. PATENT DOCUMENTS

| | | | | |
|---|---|---|---|---|
| 2020/0387094 | A1* | 12/2020 | Yamaguchi | G03G 15/2025 |
| 2021/0072676 | A1* | 3/2021 | Kawaguchi | G03G 15/2025 |
| 2021/0132526 | A1* | 5/2021 | Miyashita | G03G 15/2042 |
| 2021/0255568 | A1* | 8/2021 | Watanabe | G03G 15/2025 |
| 2022/0390884 | A1* | 12/2022 | Yamamoto | G03G 15/2064 |
| 2023/0273559 | A1* | 8/2023 | Saito | G03G 15/2064<br>399/328 |

* cited by examiner

FIXING DEVICE AND IMAGE FORMING APPARATUS

CROSS-REFERENCE TO RELATED APPLICATIONS

This application is based on and claims priority under 35 USC 119 from Japanese Patent Application No. 2022-168002 filed Oct. 20, 2022.

BACKGROUND

(i) Technical Field

The present invention relates to a fixing device and an image forming apparatus.

(ii) Related Art

There is known a heating device (JP2004-093842A) including a heating body, a heating body holding member that fixes and holds the heating body, a belt that slides on the heating body, and a pressing member that forms a nip with the heating body via the belt, in which a heating target material is interposed and transported between the belt and the pressing member at a nip portion so that the heating target material is heated by heat from the heating body via the belt. In the heating device, the base material of the belt is metal, and the heating body protrudes to become closer to a sliding surface between the heating body and the belt than the heating body holding member is.

There is also known an image heating device (JP2006-078578A) including a plate-shaped heating element, a flexible member that moves in a state of being in contact with the plate-shaped heating element, a supporting holder that holds the plate-shaped heating element and the flexible member, and an elastic roller that forms a nip portion together with the plate-shaped heating element via the flexible member, in which an image-carrying recording target material is sandwiched and transported between the flexible member and the elastic roller of the nip portion so that the recording target material is heated. In the image heating device, as seen in a cross section perpendicular to a rotation axis of the elastic roller, a central position of the plate-shaped heating element is positioned upstream of the center of the nip portion in a recording target material transportation direction, a downstream-side end portion of the plate-shaped heating element in the recording target material transportation direction is inside a nip of the nip portion, and an upstream-side end portion of the plate-shaped heating element in the recording target material transportation direction is outside a nip of a fixation nip portion.

SUMMARY

Aspects of non-limiting embodiments of the present disclosure relate to a fixing device and an image forming apparatus that improve the lifespan of a belt member while suppressing image glossiness unevenness.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a fixing device including a belt member that cyclically moves, a pressing unit that comes into contact with the belt member and presses a recording medium moving between the belt member and the pressing unit, and a heat source that includes a base material, a resistance heating element disposed on a surface of the base material along a longitudinal direction of the base material, and an insulator covering the resistance heating element and that comes into contact with the pressing unit via the belt member to heat an inner surface of the belt member, in which the insulator is formed to cover a corner portion of the base material in a direction of movement of the belt member.

BRIEF DESCRIPTION OF THE DRAWINGS

Exemplary embodiment(s) of the present invention will be described in detail based on the following figures, wherein.

DETAILED DESCRIPTION

Figure 1:
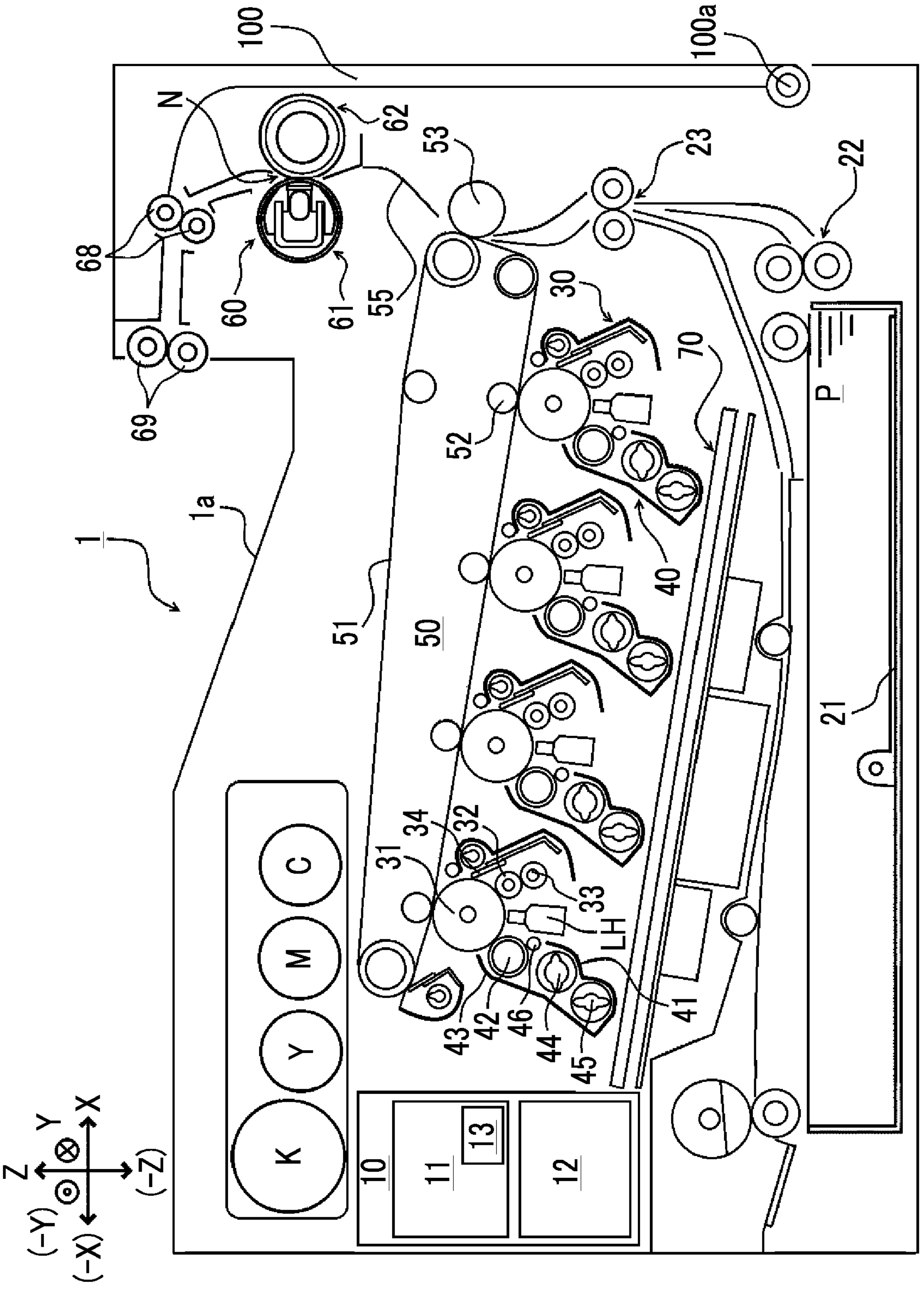
FIG. 1 is a schematic cross-sectional view showing the internal configuration of an image forming apparatus.

Next, the present invention will be more specifically described with reference to the drawings while using exemplary embodiments and a specific example as follows. However, the present invention is not limited to the exemplary embodiments and the specific example.

In addition, note that, in the following description made by using the drawings, the drawings are schematic, the ratio between dimensions or the like is different from the actual ratio, and members other than members that need to be illustrated for description have been appropriately omitted for the sake of easy understanding.

Note that, in order to facilitate understanding of the following description, in the drawings, a lateral direction will be referred to as an X-axis direction, a front-rear direction will be referred to as a Y-axis direction, and a vertical direction will be referred to as a Z-axis direction.

(1) Overall Configuration and Operation of Image Forming Apparatus

FIG. 1 is a schematic cross-sectional view showing an internal configuration of an image forming apparatus 1 according to the present exemplary embodiment.

Hereinafter, the overall configuration and the operation of the image forming apparatus 1 will be described with reference to the drawings.

The image forming apparatus 1 includes a control device 10, a paper feeding device 20, photoreceptor units 30, developing devices 40, a transfer device 50, a fixing device 60, and a power supply device 70. A discharge tray 1*a* to which a paper sheet with an image recorded thereon is discharged to be accommodated is formed at an upper surface (in a Z direction) of the image forming apparatus 1.

The control device 10 includes an image forming apparatus control unit 11 that controls the operation of the image forming apparatus 1, a controller unit 12 that prepares image data corresponding to a printing processing request, a light exposure control unit 13 that controls light exposure devices LH to be turned on or off, and the like.

The controller unit 12 converts printing information input from an external information transmitting device (for example, a personal computer or like) into image information for formation of a latent image and outputs a drive signal to the light exposure devices LH at a pre-set timing. The light exposure devices LH of the present exemplary embodiment are composed of an LED head in which a plurality of light emitting diodes (LED) are linearly arranged along a main scanning direction.

A bottom portion of the image forming apparatus 1 is provided with the paper feeding device 20. The paper feeding device 20 includes a paper loading plate 21 and a paper sheet P, which is a recording medium, is loaded on an upper surface of the paper loading plate 21. The paper sheets P that are loaded on the paper loading plate 21 and of which the positions in a width direction are determined by a regulation plate (not shown), are drawn out in a forward direction (an X direction) by a paper drawer unit 22 in a one-by-one manner from top to bottom and then are transported to a nip portion of a pair of resist rollers 23.

The photoreceptor units 30 are provided in parallel above (in the Z direction) the paper feeding device 20 and each of the photoreceptor units 30 includes a photoreceptor drum 31 that is rotationally driven and that serves as an image holder. Along the direction of rotation of the photoreceptor drum 31, a charging roller 32, the light exposure device LH, the developing device 40, a primary transfer roller 52, and a cleaning blade 34 are disposed. A cleaning roller 33 that cleans a surface of the charging roller 32 is disposed to face the charging roller 32 in a state of being in contact with the charging roller 32.

The developing device 40 includes a development housing 41 in which a developer consisting of a toner and a carrier is accommodated. In the development housing 41, a developing roller 42 that is a developer holder disposed to face the photoreceptor drum 31 and a pair of augers 44 and 45 that agitates a developer and that transports the developer to the developing roller 42 side are disposed, the pair of augers 44 and 45 being disposed behind and below the developing roller 42. A layer regulation member 46 that regulates a developer layer thickness is disposed close to the developing roller 42.

The developing devices 40 are configured in the same manner except for developers accommodated in the development housings 41 and the developing devices 40 respectively form a yellow (Y) toner image, a magenta (M) toner image, a cyan (C) toner image, and a black (K) toner image.

A surface of the photoreceptor drum 31 is charged by the charging roller 32 while the photoreceptor drum 31 is rotating and an electrostatic latent image is formed thereon by means of latent image formation light emitted from the light exposure device LH. The electrostatic latent image formed on the photoreceptor drum 31 is developed as a toner image by the developing roller 42.

The transfer device 50 is composed of an intermediate transfer belt 51, onto which color toner images respectively formed at the photoreceptor drums 31 of the photoreceptor units 30 are multilayer-transferred, the primary transfer rollers 52 that sequentially transfer (primary transfer) the color toner images respectively formed at the photoreceptor units 30 to the intermediate transfer belt 51, and a secondary transfer roller 53 that collectively transfers (secondary transfer), to the paper sheet P, the color toner images superimposed and transferred onto the intermediate transfer belt 51.

The color toner images respectively formed at the photoreceptor drums 31 of the photoreceptor units 30 are sequentially electrostatically transferred (primary transfer) onto the intermediate transfer belt 51 by the primary transfer rollers 52 to which a predetermined transfer voltage is applied from the power supply device 70 controlled by the image forming apparatus control unit 11, so that a superimposition toner image formed by superimposed color toners is formed.

As the intermediate transfer belt 51 moves, the superimposition toner image on the intermediate transfer belt 51 is transported to a region (a secondary transfer portion T) in which the secondary transfer roller 53 is disposed. In a case where the superimposition toner image is transported to the secondary transfer portion T, the paper sheet P is supplied to the secondary transfer portion T from the paper feeding device 20 in accordance with the timing of the transportation. In addition, a predetermined transfer voltage is applied to the secondary transfer roller 53 from the power supply device 70 controlled by the image forming apparatus control unit 11 so that a multilayer toner image on the intermediate transfer belt 51 is collectively transferred to the paper sheet P that is fed from the pair of resist rollers 23 and that is guided by a transportation guide.

A residual toner on a surface of the photoreceptor drum 31 is removed by the cleaning blade 34 and is collected into a waste developer accommodation portion. The surface of the photoreceptor drum 31 is recharged by the charging roller 32. Note that, a residue that adheres to the charging roller 32 without being completely removed by the cleaning blade 34 is captured by and accumulated on a surface of the cleaning roller 33 that rotates in a state of being in contact with the charging roller 32.

The fixing device 60 includes a heating module 61 provided with a heat source and a pressing module 62 and a fixation nip portion N (a fixation region) is formed by a pressure contact region between the heating module 61 and the pressing module 62.

The paper sheet P with a toner image TN transferred thereto at the transfer device 50 is transported to the fixing device 60 via the transportation guide in a state where the toner image TN is not fixed. Onto the paper sheet P transported to the fixing device 60, a toner image is fixed through pressing and heating performed by means of the heating module 61 and the pressing module 62 which form a pair.

The paper sheet P with a fixed toner image formed thereon is discharged, from a pair of discharge rollers 69, to the discharge tray 1*a* on the upper surface of the image forming apparatus 1 via a pair of transportation rollers 68.

(2) Configuration of Fixing Device 60

Figure 2:
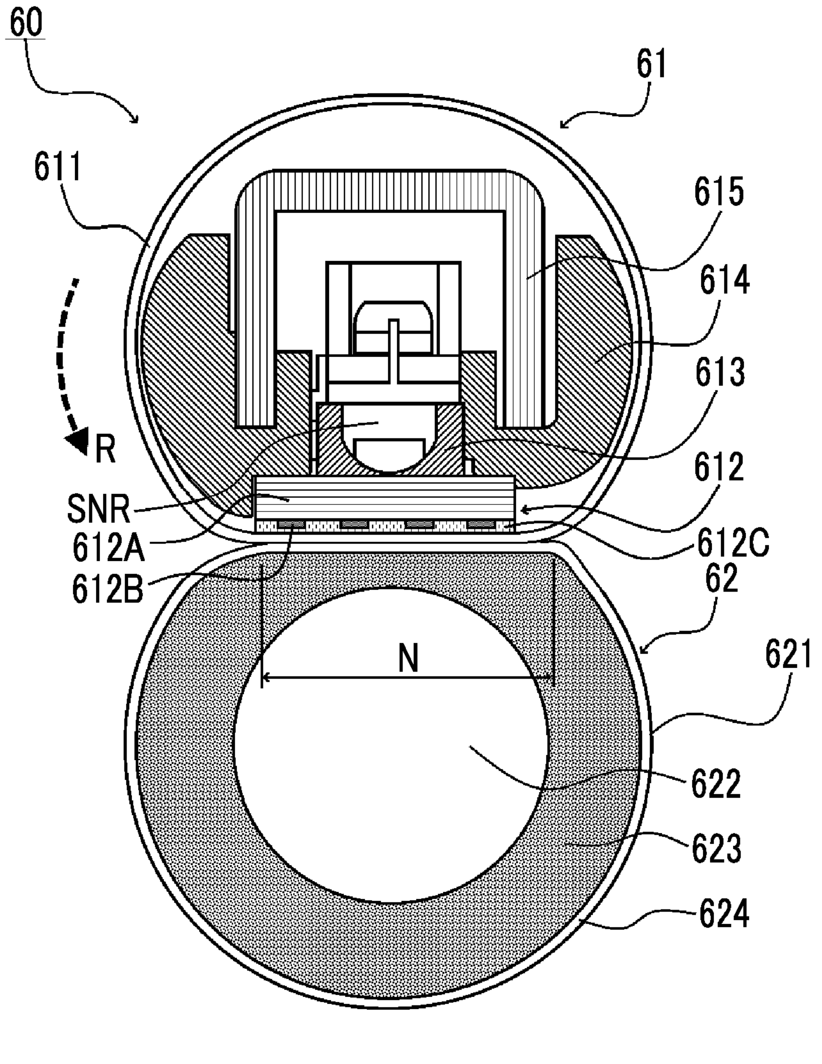
FIG. 2 is a schematic cross-sectional view showing the configuration of a fixing device.
Figure 3:
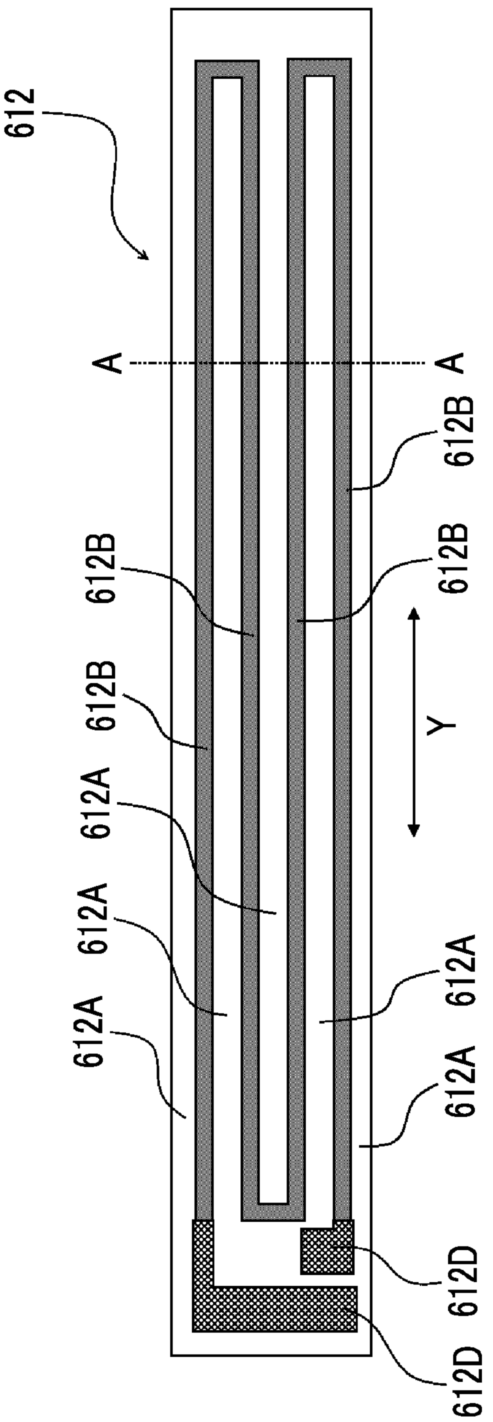
FIG. 3 is a schematic plan view showing a configuration of a heat source.
Figure 4:
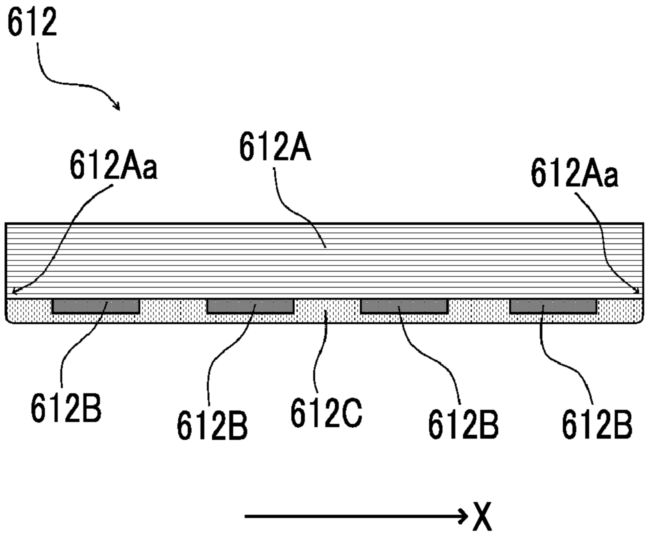
FIG. 4 is an enlarged schematic cross-sectional view taken along line A-A in FIG. 3 which is for description of the configuration of the heat source.

FIG. 2 is a schematic cross-sectional view showing the configuration of the fixing device 60, FIG. 3 is a schematic plan view showing the configuration of a heat source 612, and FIG. 4 is an enlarged schematic cross-sectional view taken along the line A-A in FIG. 3 which is for description of the configuration of the heat source 612.

(2.1) Overall Configuration of Fixing Device

The fixing device 60 is composed of the heating module 61 and the pressing module 62 which is an example of a pressing unit.

(2.2) Heating Module

The heating module 61 includes a fixation belt 611, which is an example of a belt member used for fixation of a toner image on the paper sheet P, and the heat source 612, on which an inner surface of the fixation belt 611 slides in a state of being in contact with the heat source 612. The fixation belt 611 rotates and cyclically moves in a counter-clockwise direction (refer to an arrow R in FIG. 2). The heat source 612 is held by a holding member 614 formed of a heat-resistant synthetic resin such as polyethylene terephthalate (PET). The holding member 614 has a function of holding the heat source 612 and a function as a guide that guides cyclic movement of the fixation belt 611.

In addition, the holding member 614 is supported by a support member 615 that is formed of metal and has a large bending strength.

Fixation Belt

The fixation belt 611 is a multi-layer belt member consisting of a base material layer, an elastic layer that improves fixability of the toner image TN, and a surface release layer coated as an uppermost layer.

As the base material layer, for example, a resin material or the like having a thickness of 50 μm to 200 μm (for example, a polyimide resin) is used. In order that each color toner is stacked and formed on the paper sheet P which is the target of fixation and heat is uniformly supplied to the entire toner image at the nip portion, for example, silicone rubber having a thickness of 100 μm to 600 μm and a hardness of 10° to 30° (JIS-A) is used for the elastic layer since it is preferable that the surface of the fixation belt 611 is deformed in accordance with unevenness of the toner image on the paper sheet P, for example.

As the surface release layer, for example, a tetrafluoroethylene perfluoroalkyl vinylether polymer (PFA), polytetrafluoroethylene (PTFE), a silicone copolymer, a composite layer thereof, or the like is used so that an adhesive force with respect to a toner melted on the paper sheet P is weakened and peeling off the paper sheet P from the fixation belt 611 is facilitated.

Heat Source

As shown in FIG. 2, inside the fixation belt 611, the heat source 612 extending in the direction of movement (the X direction) of the fixation belt 611 and a width direction (the Y direction) of the fixation belt 611 is provided. The heat source 612 is a planar heating element extending in a longitudinal direction, and the fixation belt 611 is heated to a predetermined temperature by the heat source 612.

The heat source 612 is configured by stacking a plurality of resistance heating elements 612B and an insulator 612C on a base material 612A.

The base material 612A is, for example, a long flat plate formed of ceramic and serves as a support for the heat source 612. On a surface side of the base material 612A, the resistance heating elements 612B are provided via an insulation layer (not shown) formed by printing and firing glass paste, and the resistance heating elements 612B are covered with the insulative insulator 612C (glass in the present exemplary embodiment).

As shown in FIG. 3, the resistance heating elements 612B are band-shaped resistance heating elements with a predetermined resistance value which are formed by printing and firing metal paste, of which the major component is an alloy of silver (Ag) and palladium (Pd), in parallel along a longitudinal direction (the Y direction) intersecting (orthogonal to) the direction of movement the fixation belt 611 on the surface side of the base material 612A.

The resistance heating elements 612B each include a power supply electrode 612D of which one end is multi-layered and that consists of, for example, a high-conductivity conductor film formed of an Ag/Pd alloy and the resistance heating elements 612B are connected to a power source (not shown) for power supply.

On the plurality of resistance heating elements 612B except for the power supply electrodes 612D and gaps between the plurality of resistance heating elements 612B, glass paste is printed in the form of a thick layer and fired so that the insulator 612C is formed. As shown in FIG. 4, the insulator 612C is formed over the entire width of the base material 612A to cover corner portions 612Aa of the base material 612A in the direction of movement (the X direction) of the fixation belt 611. Accordingly, as will be described later, an inner surface 611*a* of the fixation belt 611 is less likely to be damaged even in the case of contact between the base material 612A and the inner surface 611*a*, uneven distribution of abrasion powder is less likely to occur, and glossiness unevenness of a fixed image may be suppressed.

Modification Example

Figure 5:
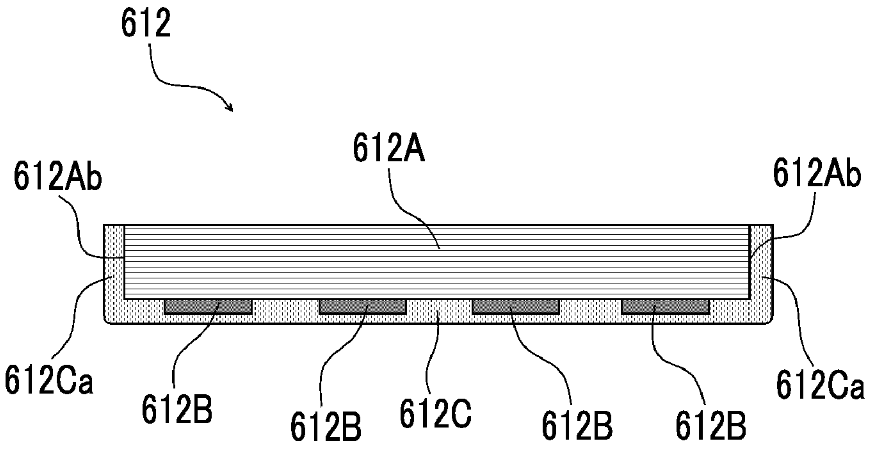
FIG. 5 is a schematic cross-sectional view showing the configuration of a heat source according to a modification example.

FIG. 5 is a schematic cross-sectional view showing the configuration of the heat source 612 according to a modification example.

The heat source 612 according to the modification example is formed such that an insulator 612Ca covers the entire width of the base material 612A and side portions 612Ab of the base material 612A in a thickness direction. Accordingly, as will be described later, in the case of unintentional deformation of the fixation belt 611 that occurs in a case where the paper sheet P is removed because of a paper jam occurring at the fixation nip portion N, contact between an inner surface of the fixation belt 611 and the side portions 612Ab of the base material 612A is suppressed and thus damage to the inner surface is suppressed.

Temperature Sensor

The heating module 61 is further provided with a temperature sensor SNR. The temperature sensor SNR penetrates the holding member 614 and a heat receiving plate 613, is disposed to come into contact with the heat source 612, and detects the temperature of the heat source 612.

In addition, a pair of belt guide members 616 (not shown) that rotatably supports inner peripheral surfaces of both open end portions of the fixation belt 611 is provided at both end portions of the holding member 614 and the support member 615.

(2.3) Pressing Module

The pressing module 62 is composed of a pressing roller 621 and a pushing mechanism (not shown) that includes a pushing spring (not shown) pushing the pressing roller 621 to the heating module 61.

The pressing roller 621 is configured by, for example, stacking a cylindrical core material 622 formed of metal, a heat-resistant elastic body layer 623 (for example, a silicone rubber layer, a fluororubber layer, or the like) coated on an outer peripheral surface of the core material 622, and a surface release layer 624 formed of a heat-resistant resin coating or a heat-resistant rubber coating formed of PFA or the like as necessary, for example.

The pressing roller 621 receives power from a motor (not shown) and rotates in a clockwise direction (a direction opposite to a direction along the arrow R). As the pressing roller 621 rotates, the fixation belt 611 is driven to rotate in the counterclockwise direction in the drawing (in the direction along the arrow R in FIG. 2). In a case where the paper sheet P is transported in a state of being sandwiched at the fixation nip portion N, heat from the heat source 612 is transferred to the toner image TN on the paper sheet P with which the surface of the fixation belt 611 comes into contact, so that the toner image TN is heat-fixed to the paper sheet P.

(3) Fixation Effect

Figure 6A:
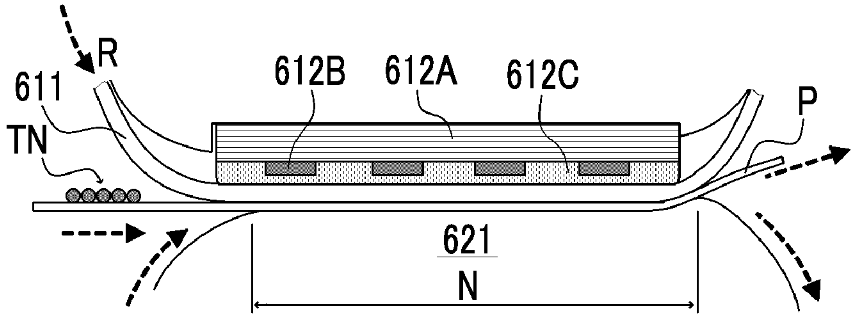
FIG. 6A is a diagram for description of a fixation effect of a toner image in the fixing device and FIG. 6B is a conceptual diagram for description of a distortion change caused by expansion and contraction of a surface of a fixation belt in a fixation nip portion.
Figure 6B:
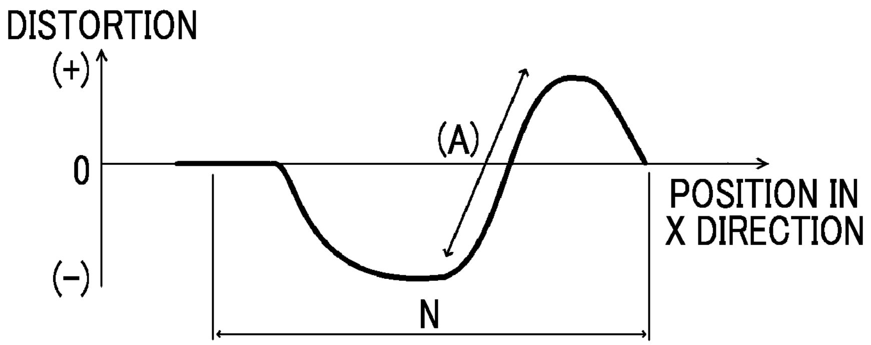

FIGS. 6A and 6B are diagrams for description of a fixation effect of a toner image in the fixing device 60.

Regarding the fixing device 60, as schematically shown in FIG. 6A, the fixation belt 611 that is used for fixation of a toner image on the paper sheet P rotates and cyclically moves in the counterclockwise direction in the drawing (refer to the arrow R in FIGS. 6A and 6B) by being driven by the pressing roller 621 with the inner surface thereof sliding on the heat source 612 in a state of being in contact with the heat source 612, the pressing roller 621 coming into pressure-contact with the fixation belt 611 at the fixation nip portion N.

In a case where the paper sheet P with the toner image TN transferred thereto in the transfer device 50 is transported in a state of being sandwiched at the fixation nip portion N, heat from the heat source 612 is transferred to the toner image on the paper sheet P with which the surface of the fixation belt 611 comes into contact, so that the toner image is heat-fixed to the paper sheet P.

FIG. 6B conceptually shows a distortion change caused by expansion and contraction of the surface of the fixation belt 611 in the fixation nip portion N.

In the fixing device 60, since there is a distortion change caused by expansion and contraction of the surface of the fixation belt 611 along the direction of movement of the fixation belt 611 in the fixation nip portion N as conceptually shown in FIG. 6B, a shearing force that shifts a toner surface in a transportation direction is applied to improve non-uniformity of an unfixed toner image, unevenness of a fixed toner image is suppressed, and glossiness is increased. It is known that a rear end side (particularly a range of (A) in FIG. 6B) of the fixation nip portion N in the direction of movement of the fixation belt 611 where the temperature of the toner image TN is made high and the toner image TN is likely to be melted and deformed is appropriate for a position where such a distortion change is applied to the surface of the fixation belt 611.

Figure 8:
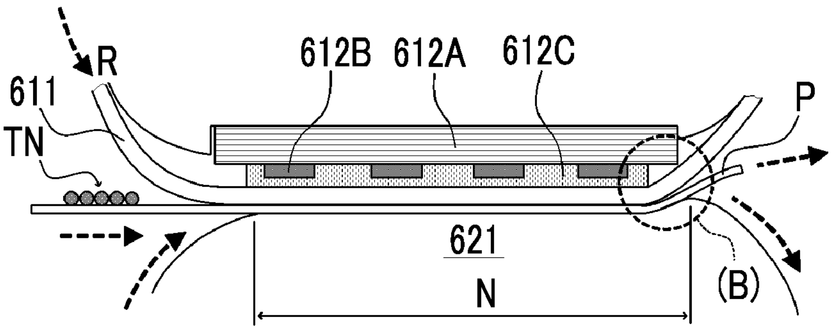
FIG. 8 is a diagram for description of a fixation effect of a toner image in a fixing device of a comparative example.
Figures 9A, 9B, 9C:
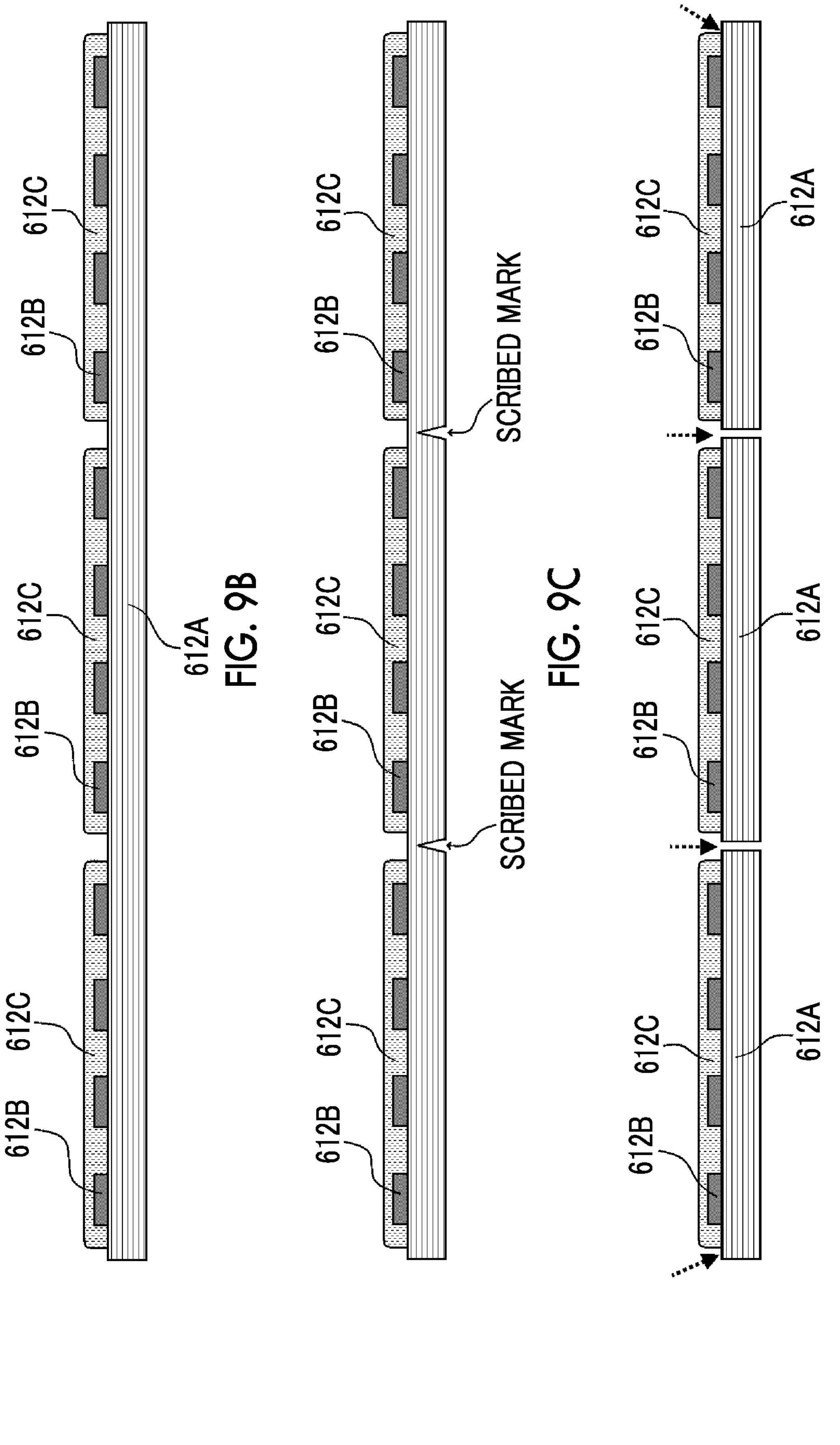
FIGS. 9A to 9C are schematic cross-sectional views showing a heat source manufacturing process.

FIG. 8 is a view for description of a fixation effect of the toner image TN in a fixing device 100 in a comparative example in which no insulator 612C is formed at the corner portions 612Aa of the base material 612A in the direction of movement of the fixation belt 611 and FIGS. 9A to 9C are schematic cross-sectional views showing the manufacturing process of the heat source 612.

As shown in FIGS. 9A to 9C, the heat source 612 is formed by forming the plurality of resistance heating elements 612B and the insulator 612C on one base material 612A and cutting the base material 612A in units of resistance heating elements 612B as necessary (refer to scribed marks in FIG. 9B). In this case, as shown in FIG. 9C, no insulator 612C is stacked on end portions of the base material 612A and ceramics are exposed at the end portions of the base material 612A (represented by arrows in FIG. 9C).

In the case of a heat source in which no insulator 612C is stacked on end portions of the base material 612A and ceramics are exposed at the end portions as described above, the inner surface 611*a* of the fixation belt 611 is likely to come into contact with the corner portion 612Aa of the base material 612A on the rear end side of the fixation nip portion N in the direction of movement of the fixation belt 611 (a region (B) surrounded by a broken line in FIG. 8) as shown in FIG. 8. As a result, ceramics of the base material 612A may damage the inner surface 611*a* of the fixation belt 611 to shorten the lifespan of the fixation belt 611, or uneven accumulation of abrasion powder may cause stripe-shaped image defects.

Regarding the heat source 612 in the fixing device 60 according to the present exemplary embodiment, as shown in FIGS. 6A and 6B, the insulator 612C is formed over the entire width of the base material 612A to cover the corner portions 612Aa of the base material 612A in the direction of movement of the fixation belt 611. Accordingly, on the rear end side of the fixation nip portion N in the direction of movement of the fixation belt 611, the inner surface 611*a* of the fixation belt 611 comes into contact with the base material 612A via the insulator 612C. Since the insulator 612C is formed of a glass material and has a smooth surface in comparison with ceramics, the insulator 612C is less likely to damage the inner surface 611*a* of the fixation belt 611 even in a case where the insulator 612C comes into contact with the inner surface 611*a* and glossiness unevenness in a fixed image may be suppressed since uneven distribution or the like of abrasion powder is less likely to occur.

Figure 7A:
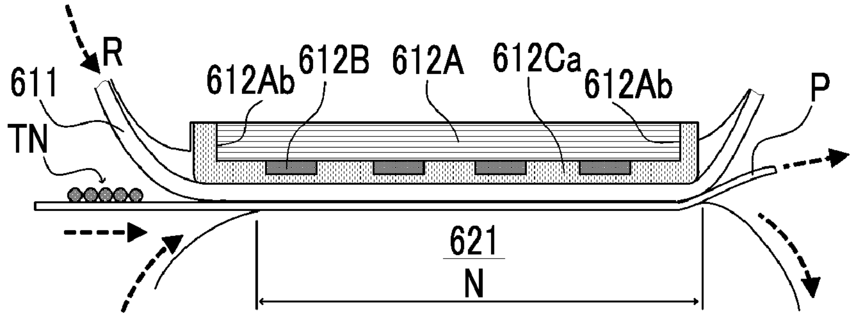
FIGS. 7A and 7B are views schematically showing deformation of the fixation belt of the fixing device provided with the heat source in the modification example.
Figure 7B:
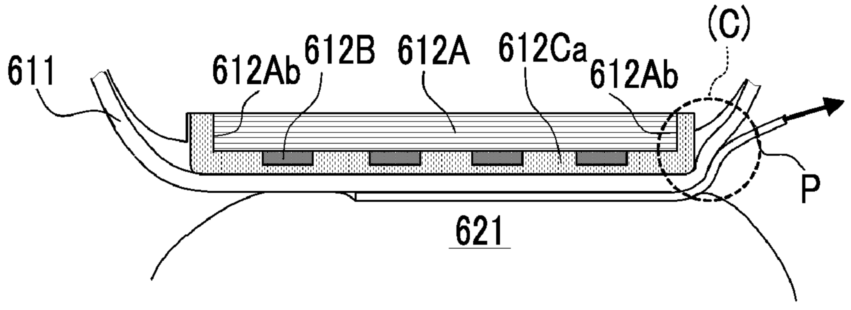

FIGS. 7A and 7B schematically show deformation of the fixation belt 611 of the fixing device 60 provided with the heat source 612 in the modification example in which the insulator 612Ca is formed to cover the entire width of the base material 612A and the side portions 612Ab of the base material 612A in a thickness direction.

In a case where the paper sheet P is removed because of a paper jam occurring at the fixation nip portion N, the fixation belt 611 may be unintentionally deformed and the inner surface 611*a* of the fixation belt 611 may be damaged with the inner surface 611*a* of the fixation belt 611 coming into contact with the side portions 612Ab of the base material 612A.

The heat source 612 according to the modification example is formed such that the insulator 612Ca formed of glass covers the entire width of the base material 612A and the side portions 612Ab of the base material 612A in the thickness direction. Accordingly, as schematically shown in FIG. 7B, even in a case where the fixation belt 611 is unintentionally deformed and the inner surface 611*a* of the fixation belt 611 comes into contact with the side portions 612Ab of the base material 612A, the inner surface 611*a* is less likely to be damaged (a region (C) surrounded by a broken line in FIGS. 7A and 7B).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A fixing device comprising:

a belt member that cyclically moves;

a pressing unit, which comprises a pressing roller, that comes into contact with the belt member and presses a recording medium moving between the belt member and the pressing unit;

a heat source that includes a base material, a resistance heating element disposed on a surface of the base material along a longitudinal direction of the base material, and an insulator covering the resistance heating element and that comes into contact with the pressing unit via the belt member to heat an inner surface of the belt member; and a holding member that holds the heat source, wherein the insulator is formed to cover a corner portion of the base material in a direction of movement of the belt member, wherein a nip portion is formed by a pressure contact region between the heat source and the pressing unit, wherein a surface of the insulator which comes into contact with the inner surface of the belt member is flat, wherein a portion of the holding member which is closest to the pressing unit is positioned on a side without the pressing unit relative to the nip portion, wherein a rear end of the nip portion is positioned further downstream side in the direction of movement of the belt member relative to a rear end of the insulator.

2. The fixing device according to claim 1, wherein the insulator is formed to cover a side portion of the base material in a thickness direction.

3. The fixing device according to claim 2, wherein the inner surface of the belt member comes into contact with the corner portion of the base material via the insulator on a downstream side in the direction of movement.

4. An image forming apparatus comprising:

an image forming unit that forms an image on a recording medium and that comprises a photoreceptor drum; and the fixing device according to claim 3 that fixes the image to the recording medium on which the image has been formed by the image forming unit.

5. An image forming apparatus comprising:

an image forming unit that forms an image on a recording medium and that comprises a photoreceptor drum; and the fixing device according to claim 2 that fixes the image to the recording medium on which the image has been formed by the image forming unit.

6. The fixing device according to claim 1, wherein the inner surface of the belt member comes into contact with the corner portion of the base material via the insulator on a downstream side in the direction of movement.

7. An image forming apparatus comprising:

an image forming unit that forms an image on a recording medium and that comprises a photoreceptor drum; and the fixing device according to claim 6 that fixes the image to the recording medium on which the image has been formed by the image forming unit.

8. An image forming apparatus comprising:

an image forming unit that forms an image on a recording medium and that comprises a photoreceptor drum; and the fixing device according to claim 1 that fixes the image to the recording medium on which the image has been formed by the image forming unit.

* * * * *